G. ENGEL, Sr.
CASTING PROCESS.
APPLICATION FILED NOV. 2, 1920.
1,423,654.
Patented July 25, 1922.
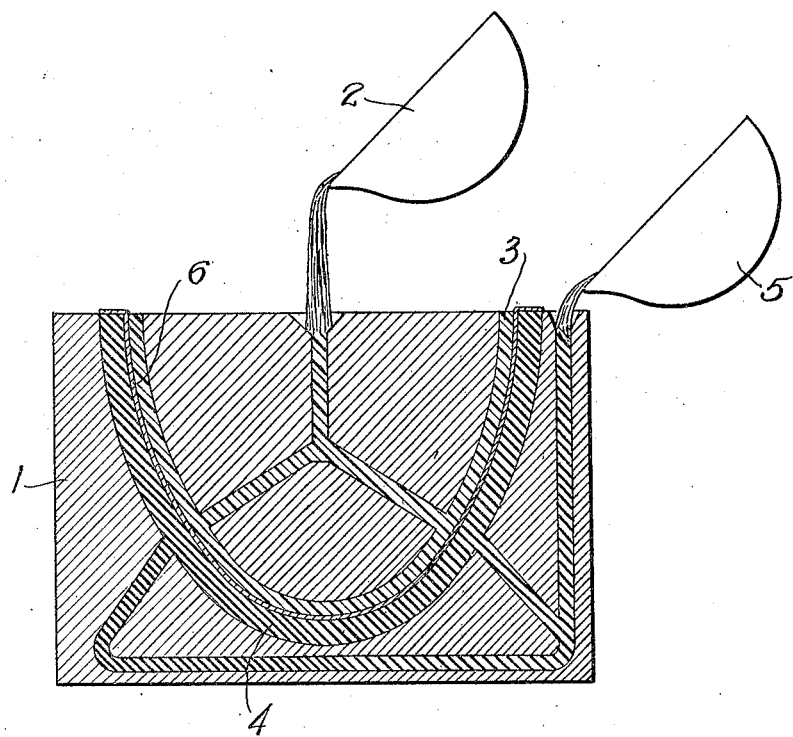
Inventor.
Godfrey Engel, Sr.
By his Attorney
E. W. Marshall

UNITED STATES PATENT OFFICE.

GODFREY ENGEL, SR., OF BROOKLYN, NEW YORK, ASSIGNOR TO BUFFALO FOUNDRY & MACHINE CO., OF BUFFALO, NEW YORK, A CORPORATION OF NEW YORK.

CASTING PROCESS.

1,423,654.   Specification of Letters Patent.   Patented July 25, 1922.

Application filed November 2, 1920. Serial No. 421,241.

*To all whom it may concern:*

Be it known that I, GODFREY ENGEL, Sr., a citizen of the United States, and a resident of Brooklyn, county of Kings, and State of New York, have invented certain new and useful Improvements in Casting Processes, of which the following is a specification.

My present invention has for its purpose to enable economical and practical casting of objects with inner and outer surfaces of different characteristics. I have in mind particularly the production of kettles such as are used in certain chemical and industrial operations, where the inner surface, for instance, should be of an acid resisting character and where the outer portion of the vessel need not possess this characteristic, but should possess great strength.

To produce a vessel of this character according to one embodiment of my invention, I pour the metal for the outer and inner surfaces of the vessel into engagement with an interposed shell which will weld with the two bodies of metal and form a bond therebetween.

In the accompanying illustration I have disclosed one practical way of accomplishing the results sought. In this view 1 designates a mold for casting a kettle or similar object.

The metal for the interior of the article, which may be of acid resisting characteristics, such as iron containing a portion of silicon, is cast from one source 2, so as to form the inner layer 3 of the vessel wall, and the metal for the outer layer 4 which may be iron or steel to provide the desired strength is cast from another source as indicated at 5.

Interposed in the mold so as to temporarily separate and eventually form a bond between the two layers, 3 and 4, is a shell 6 of steel, for instance, and which preferably is of a higher melting point than the metals of the outer and inner layers, but not so high but that it will unite with a good surface weld with both metals.

Preliminary to the actual casting, the shell 6 which usually conforms generally to the contour of the completed article, is supported in the mold cavity between the opposing mold walls so as to constitute a barrier between the two bodies of metal. The inner layer 3 may be first cast and allowed to cool somewhat so as to permit of a certain shrinkage, after which the outer layer is cast, the latter as it cools shrinking onto the inner layer with the interposed bonding shell. This outer layer may be made somewhat thicker than the inner layer so as to give it the necessary strength and enable it to shrink firmly over the inner layer. This shrinking operation in conjunction with the fact that the surface welds are formed between both the inner layer and the shell and the outer layer and the shell, provides what is practically a unitary structure.

By the use of different metals it will be seen that the invention may be adapted to a great variety of purposes, the instance given being merely one illustration of its use.

At the present time I consider it preferable to cast the outer thicker layer first, and to then cast the inner thinner layer, the outer layer, on account of its greater thickness, cooling more slowly and, therefore, shrinking as it sets, onto the inner layer. The cooling of the inner layer may be hastened by withdrawing the core of the mold directly after the inner cast is made. In another embodiment of the invention, the inner layer is produced by dipping a core of the required shape into a bath of molten metal, and quickly withdrawing the same so as to form a relatively thin shell on the core, the outer layer being then cast about this shell either with or without the interposed bonding layer before described.

In performing the process in this way, the core may be artificially cooled or "chilled" so as to cause the molten metal to set in the form of a relatively thin coating thereon.

What I claim is:

The herein disclosed process of casting a containing vessel which comprises casting a relatively thick outer layer of the external shape of the vessel and subsequently casting a thinner inner layer of the internal shape of the vessel within the thicker outer layer and permitting the inner thinner layer to cool before the outer thicker layer so as to cause the latter to shrink onto the former.

In witness whereof, I hereunto set my hand this 28th day of October, 1920.

GODFREY ENGEL, Sr.